US010927683B2

(12) United States Patent
Joly et al.

(10) Patent No.: US 10,927,683 B2
(45) Date of Patent: Feb. 23, 2021

(54) DAMPING DEVICE

(71) Applicant: SAFRAN AIRCRAFT ENGINES, Paris (FR)

(72) Inventors: Philippe Gerard Edmond Joly, Moissy-Cramayel (FR); Francois Jean Comin, Moissy-Cramayel (FR); Laurent Jablonski, Moissy-Cramayel (FR); Romain Nicolas Lagarde, Moissy-Cramayel (FR); Jean-Marc Claude Perrollaz, Moissy-Cramayel (FR); Charles Jean-Pierre Douguet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 181 days.

(21) Appl. No.: 16/219,823

(22) Filed: Dec. 13, 2018

(65) Prior Publication Data
US 2019/0186276 A1   Jun. 20, 2019

(30) Foreign Application Priority Data

Dec. 14, 2017   (FR) ....................................... 1762170
Dec. 15, 2017   (FR) ....................................... 1762301

(51) Int. Cl.
*F01D 5/22* (2006.01)
*F01D 5/30* (2006.01)
(Continued)

(52) U.S. Cl.
CPC ................. *F01D 5/22* (2013.01); *F01D 5/10* (2013.01); *F01D 5/3007* (2013.01); *F01D 25/06* (2013.01);
(Continued)

(58) Field of Classification Search
CPC . F01D 5/22; F01D 5/10; F01D 5/3007; F01D 5/26; F01D 25/06; F16F 15/12;
(Continued)

(56) References Cited

U.S. PATENT DOCUMENTS 3,070,284 A * 12/1962 Kent ................... B64C 29/0016
416/171
3,734,646 A * 5/1973 Perkins ................... F01D 5/326
416/220 R (Continued)

FOREIGN PATENT DOCUMENTS

EP   1985810 A1   10/2008
FR   2345605 A1   10/1977
(Continued)

OTHER PUBLICATIONS

Preliminary Research Report received for French Application No. 1762301, dated Jul. 31, 2018, 3 pages (1 page of French Translation Cover Sheet and 2 pages of original document).
(Continued)

*Primary Examiner* — David E Sosnowski
*Assistant Examiner* — Hakeem M Abdellaoui
(74) *Attorney, Agent, or Firm* — Womble Bond Dickinson (US) LLP (57) ABSTRACT

The invention relates to a turbomachine assembly (1) comprising:
 a first rotor module (2) comprising a disk (21), a first blade (20) being mounted on the external periphery of the disk (21), the first blade (20) comprising a platform (25) and a support (27),
 a second rotor module (3), connected to the first rotor module (2) by means of at least two attachments (22) and comprising a second blade of smaller length than the first blade (20), and
(Continued)

a damping device (4) attached to the attachment (22) between the first (2) and the second (3) rotor module so as to dampen their vibrational movements during operation, and comprising:
  a head (40) comprising a first radial external surface (42) supported with friction against the platform (25), and
  two attachment feet (41) extending on either side of the support (27) of the first blade (20).

11 Claims, 8 Drawing Sheets

(51) Int. Cl.
  *F01D 5/10* (2006.01)
  *F16F 15/12* (2006.01)
  *F01D 25/06* (2006.01)
(52) U.S. Cl.
  CPC .......... *F16F 15/12* (2013.01); *F05D 2220/36* (2013.01); *F05D 2240/80* (2013.01); *F05D 2260/96* (2013.01)
(58) Field of Classification Search
  CPC ............. F05D 2220/36; F05D 2240/80; F05D 2260/96; F05D 2300/43
  USPC .............................................. 416/193 A, 500
  See application file for complete search history.

(56) References Cited

U.S. PATENT DOCUMENTS

| | | | |
|---|---|---|---|
| 3,936,222 A * | 2/1976 | Asplund | F01D 5/3015 416/95 |
| 4,192,633 A * | 3/1980 | Herzner | F01D 5/10 415/119 |
| 4,483,661 A * | 11/1984 | Manharth | F01D 5/326 416/220 R |
| 4,723,889 A | 2/1988 | Charreron et al. | |
| 5,205,713 A | 4/1993 | Szpunar et al. | |
| 5,582,077 A * | 12/1996 | Agram | F01D 5/027 403/318 |
| 5,820,346 A | 10/1998 | Young et al. | |
| 8,465,258 B2 * | 6/2013 | Forgue | F01D 11/008 416/193 R |
| 2009/0010762 A1 | 1/2009 | Caucheteux et al. | |
| 2009/0123286 A1 | 5/2009 | Mace et al. | |
| 2011/0255973 A1 * | 10/2011 | Borufka | F01D 5/26 416/140 |
| 2012/0141296 A1 | 6/2012 | Bilz et al. | |
| 2013/0323031 A1 | 12/2013 | Zhang et al. | |
| 2017/0037738 A1 * | 2/2017 | Marin | F01D 5/326 |
| 2018/0112545 A1 * | 4/2018 | De Gaillard | F01D 5/323 |
| 2019/0120255 A1 * | 4/2019 | Tomeo | F01D 5/10 |
| 2020/0063564 A1 * | 2/2020 | Tatman | F01D 5/082 |

FOREIGN PATENT DOCUMENTS

| | | |
|---|---|---|
| FR | 2915510 A1 | 10/2008 |
| FR | 2923557 | 5/2009 |
| FR | 2949142 | 2/2011 |
| FR | 3047512 A1 | 8/2017 |

OTHER PUBLICATIONS

Preliminary Research Report received for French Application No. 1762170, dated Jul. 31, 2018, 3 pages (1 page of French Translation Cover Sheet and 2 pages of original document).

* cited by examiner

DAMPING DEVICE

TECHNICAL FIELD

The invention relates to an assembly comprising a turbomachine rotor module.

The invention relates more specifically to a turbomachine assembly comprising two rotor modules and a damping device.

PRIOR ART

A turbomachine rotor module generally comprises one or more stage(s), each stage comprising a disk centered on a turbomachine longitudinal axis, corresponding to the axis of rotation of the rotor module. The rotation of the disk is generally provided for by a rotating shaft to which is integrally connected, for example by means of a rotor module trunnion, the rotating shaft extending along the longitudinal axis of the turbomachine. Blades are mounted on the external periphery of the disk, and distributed circumferentially in a regular manner around the longitudinal axis. Each blade extends from the disk, and also comprises an airfoil, a platform, a support and a root. The root is embedded in a recess of the disk configured for this purpose, the airfoil is swept by a flow passing through the turbomachine, and the platform forms a portion of the internal surface of the flow path.

The field of operation of a rotor module is limited, in particular due to aeroelastic phenomena. The rotor modules of modern turbomachines, which have a high aerodynamic loading and a reduced number of blades, are more sensitive to this type of phenomenon. In particular, they have reduced margins between operating regions without instability and unstable regions. It is nevertheless imperative to guarantee a sufficient margin between the region of stability and that of instability, or demonstrate that the rotor module can operate in the instability region without exceeding its endurance limit. This allows guaranteeing risk-free operation through its entire lifetime and the entire operating field of the turbomachine.

Operation in the instability region is characterized by coupling between the fluid and the structure, the fluid applying the energy to the structure, and the structure responding with its natural modes at levels which can exceed the endurance limit of the material constituting the blade. This generates vibrational instabilities which accelerate the wear of the rotor module and reduce its lifetime.

In order to limit these phenomena, it is known to implement a system for damping the dynamic response of the blade, so as to guarantee that it will not exceed the endurance limit of the material, regardless of the operating point of the rotor module. However, most systems known from the prior art are dedicated to dampening vibration modes with non-zero dephasing, and characterizing an asynchronous response of the blades to aerodynamic forces. Such systems have for example been described in documents FR 2 949 142, EP 1 985 810, FR 2 923 557, in the Applicant's name. These systems are all configured to be accommodated between the platform and the root of each blade in the recess delimited by the respective supports of two successive blades. Moreover, such systems operate when two successive blade platforms move with respect to one another, by dissipation of the vibration energy, for example by friction.

These systems, however, are totally ineffective for damping vibration modes with zero dephasing involving the blade and the rotor line, that is its rotating shaft. Such modes are characterized by a flexure of the rotor blades with zero interblade dephasing implying a non-zero moment on the rotating shaft. In addition, this is a mode coupling the blade, the disk and the rotating shaft. More precisely, the torsion within the rotor module, resulting for example from reverse forces between a turbine rotor and a compressor rotor, leading to flexural movements of the blades with respect to their attachment to the disk. These movements are greater the bigger the blade, and the more flexible the attachment.

There exists therefore a need for a damping system for a turbomachine rotor allowing limiting the instabilities generated by all the vibration modes as previously described.

SUMMARY OF THE INVENTION

One aim of the invention is to dampen vibration loads with zero dephasing for all types of turbomachine rotor modules.

Another aim of the invention is to influence the damping of vibration modes with nonzero dephasing, for all types of turbomachine rotor modules.

Another aim of the invention is to propose a simple damping solution that is easy to implement.

The invention proposes in particular a turbomachine assembly comprising:
  a first rotor module comprising a disk centered on a turbomachine longitudinal axis, a first blade being mounted on the external periphery of the disk from which it extends, the first blade comprising an airfoil, a platform, a support and a root embedded in a recess of the disk,
  a second rotor module, connected to the first rotor module by means of at least two attachments, and comprising a second blade of smaller length than the first blade, and
  a damping device attached to the attachment between the first and the second rotor module so as to dampen their vibrational movements during operation, and comprising:
    a head, said head comprising a first radial external surface supported with friction against an internal surface of the platform of the first blade, and
    two attachment feet extending on either side of the support of the first blade, each being connected to one at least of the respective attachments.

The presence of the damping device ensures tangential coupling between the first and the second rotor module. The damping device being supported below the platform of a blade, and attached to the attachment between the first and second rotor module, the vibrations according to a mode with zero dephasing are damped by the mutual differences in vibration amplitude. The features of the head and of the attachment feet also allow controlling the tangential flexibility of the damping device, and thus the amplitude of damping during operation.

According to another aspect, the invention relates to a turbomachine assembly comprising:
  a first rotor module comprising a disk centered on a turbomachine longitudinal axis, two first blades being mounted on the external periphery of the disk from which they extend, the first blades each comprising an airfoil, a platform, a support and a root embedded in a recess of the disk,
  a second rotor module, connected to the first rotor module by means of a first, a second and a third attachment, and comprising a second blade with a smaller length than the first blades, and a first damping device attached to the first and second attachments between the first and the second rotor module, so as to dampen their vibrational movements during operation, and comprising:
- a head, said head comprising a first radial external surface supported with friction against an internal surface of the platform of a first of the two first blades, and
- two attachment feet extending on either side of the support of this first of the two first blades, each of the attachment feet being respectively connected to one of the first or of the second attachments, and a second damping device attached to the second and to the third attachment between the first and the second rotor module, so as to dampen their vibrational movements during operation, and comprising:
- one head, said head comprising a first radial external surface supported with friction against an internal surface of the platform of a second of the two first blades, and
- two attachment feet extending on either side of the support of this second of the two first blades, each of the attachment feet being respectively connected to one of the second or of the third attachment.

The assembly according to the invention can also comprise the following features taken alone or in combination:
- the attachment feet are formed from, preferably elastic, sheet metal,
- the head comprises a sacrificial plate, said plate comprising an additional coating defining the support surface,
- the additional coating is of the dissipative type,
- the additional coating is of the viscoelastic type,
- the damping device comprises bores designed to lighten the damping device,
- the damping device comprises inserts, of the metallic type for example, designed to add weight to the device,
- the first module is a fan, and the second module a compressor, for example a low-pressure compressor, and
- the head comprises a second radial external surface supported with friction against the second rotor module so as to also dampen the respective vibrational movements of the first rotor module and of the second rotor module during operation The invention also relates to a turbomachine comprising an assembly as previously described.

Finally, the invention relates to a damping device configured to be attached to the attachment between the first and the second rotor module of an assembly as previously described, so as to dampen their vibrational movements during operation.

RAPID DESCRIPTION OF THE FIGURES

Other features, aims and advantages of the present invention will appear upon reading the detailed description which follows and with reference to the appended drawings given by way of non-limiting examples and in which.

DETAILED DESCRIPTION OF THE INVENTION

One exemplary embodiment of an assembly 1 according to the invention will now be described, with reference to the figures.

Hereafter, upstream and downstream are defined with respect to the air flow normal direction through the turbomachine. Moreover, a turbomachine longitudinal axis X-X is defined. In this manner, the axial direction corresponds to the direction of the turbomachine longitudinal axis X-X, a radial direction is one which is perpendicular to this turbomachine longitudinal axis X-X and which passes through said turbomachine longitudinal axis X-X, and a circumferential direction corresponds to the direction of a closed curved planar line of which all points are located at an equal distance from the turbomachine longitudinal axis X-X. Finally, and unless otherwise stated, the terms "internal (or interior)" and "external (or exterior)", respectively, are used with reference to a radial direction so that the internal (i.e. radially internal) portion or face of an element is closer to the turbomachine longitudinal axis X-X than the external (i.e. radially external) portion or face of the same element.

With reference to FIGS. 1a, 1b, 3a and 5a, such an assembly 1 comprises:
- a first rotor module 2 comprising a disk 21 centered on the turbomachine longitudinal axis X-X, a first blade 20 being mounted on the external periphery of the disk 21 from which it extends, the first blade 20 comprising an airfoil 23, a platform 25, a support 27 and a root 29 embedded in a recess 210 of the disk 21,
- a second rotor module 3, connected to the first rotor module 2 by means of at least two attachments 22 and comprising a second blade 30 with a smaller length than the blade 20, and
- a damping device 4 attached to the attachment 22 between the first 2 and the second 3 rotor module so as to dampen their vibrational movements during operation, and comprising:
  - a head 40, said head 40 comprising a first radial external surface 42 supported with friction against an internal surface 250 of the platform 25 of the first blade 20, and
  - two attachment feet 41 extending on either side of the support 27 of the first blade 20, each being connected to one at least of the respective attachments 22.

By support "with friction" is meant that the contact between the first radial external surface 42 and the internal surface 250 of the platform 25 of the first blade 20 occurs with friction. In other words, the support forces between the first radial external surface 42 and the internal surface 250 of the platform 25 of the first blade 20 can be decomposed into pressure forces, which are directed normal to the contact, and friction forces directed tangential to the contact. This support guarantees both the mechanical cohesion of the assembly 1, by means of the pressure forces, but also coupling between the modules 2, 3 for the purpose of damping their respective vibrational movements during operation, by means of the friction forces.

In addition, the attachment feet 41 and the head 40 are formed integrally, that is they are a single part formed of a single piece, according to a monobloc, or monolithic, configuration.

Figure 1A:
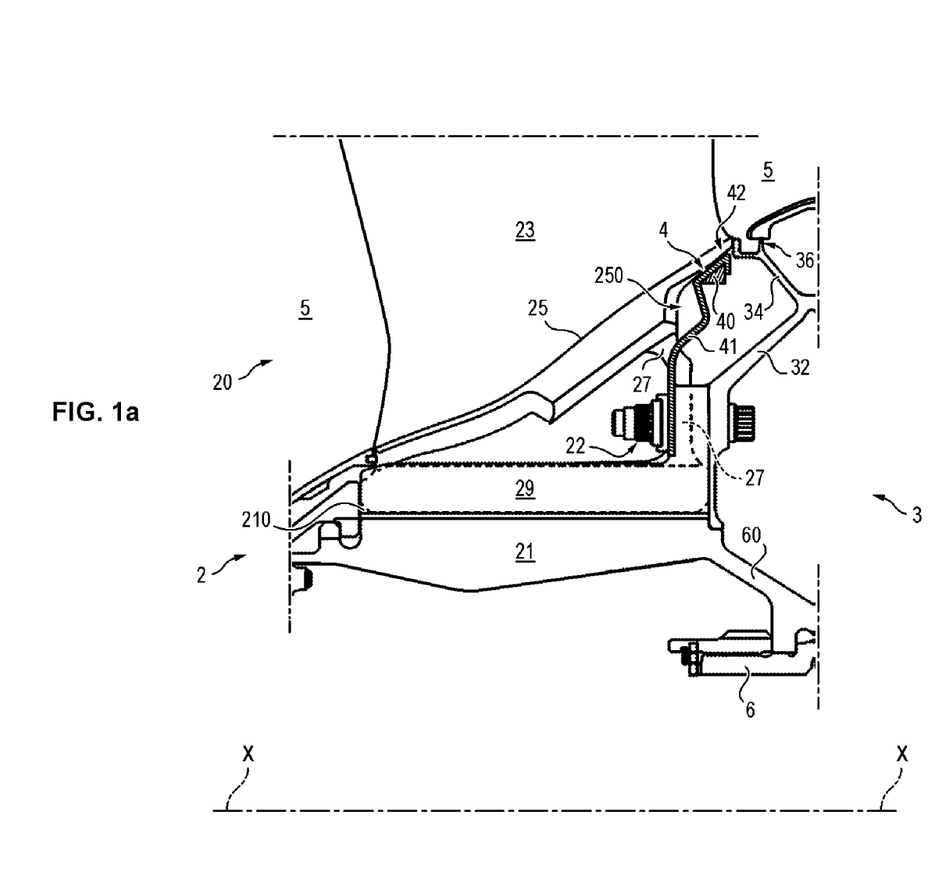
FIG. 1a is a schematic section view of an exemplary embodiment of an assembly according to the invention.
Figure 1B:
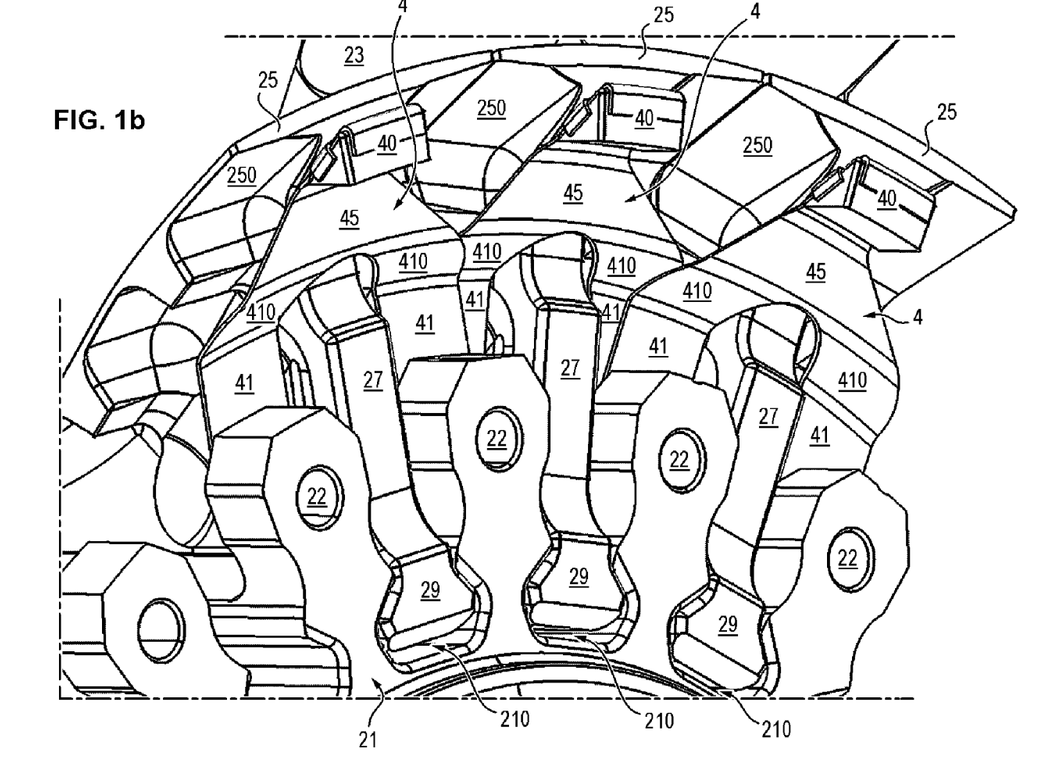
FIG. 1b is a schematic perspective view of an exemplary embodiment of the assembly according to the invention.
Figure 3A:
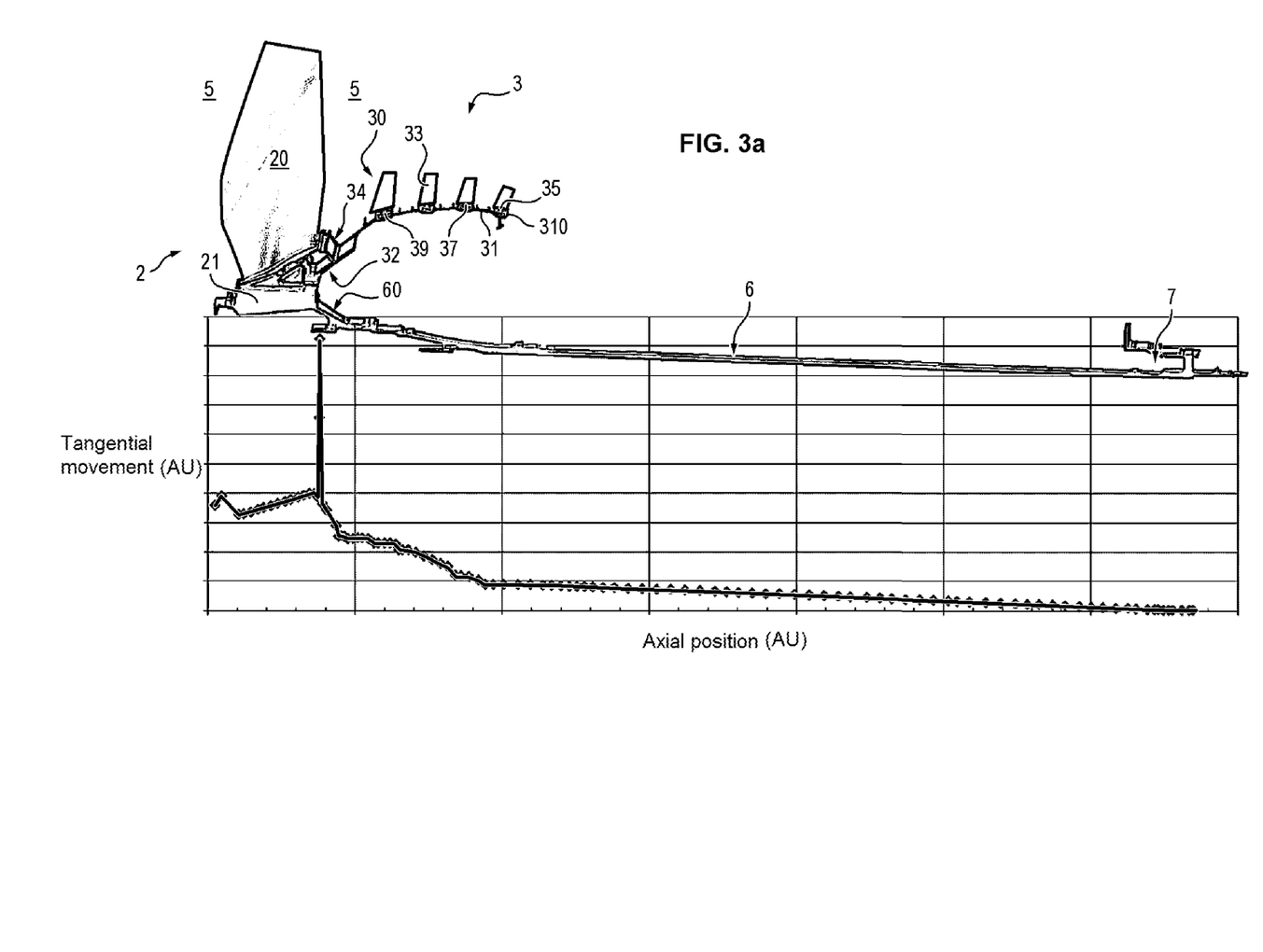
FIG. 3a illustrates schematically the tangential movements of the rotor modules of the turbomachine, depending on the position of said modules along the axis of the turbomachine.
Figure 5A:
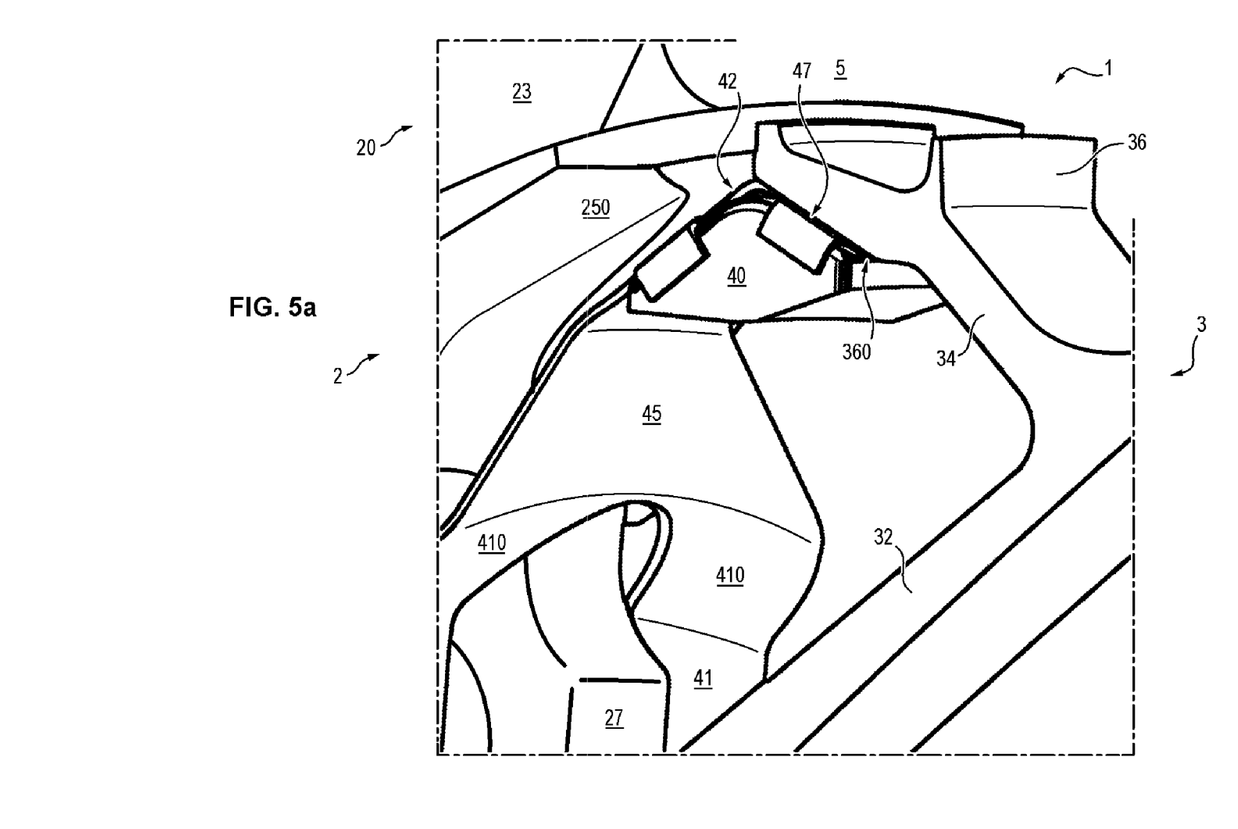
FIG. 5a is a schematic perspective view of an exemplary embodiment of the assembly according to the invention.

With reference to FIGS. 1, 3a and 5a, the first rotor module is a fan 2, and the second rotor module is a low-pressure compressor 3, situated immediately downstream of the fan 2.

Figure 2:
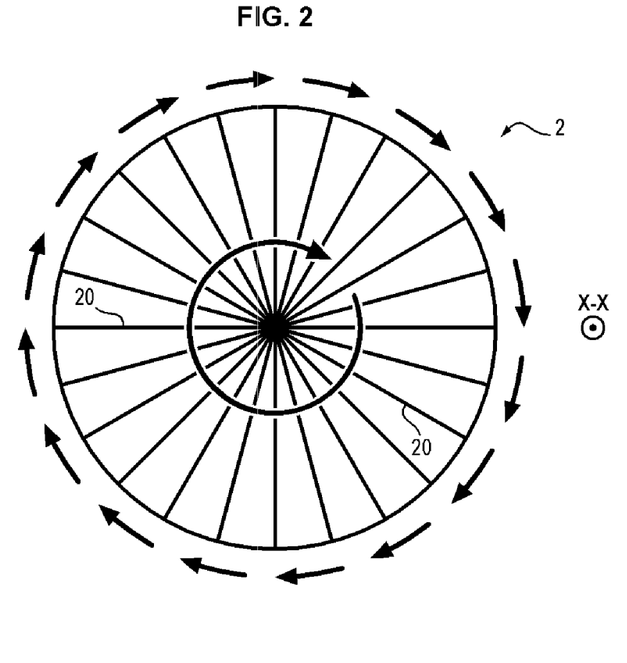
FIG. 2 is a front view of a rotor module subjected to tangential vibrations of which the mode has zero dephasing.

The fan 2 and the low-pressure compressor 3 comprise a disk 21, 31 centered on the turbomachine longitudinal axis X-X, the first 20 and the second 30 blade being respectively mounted on the external periphery of the disk 21, 31 and also comprising an airfoil 23, 33, a platform 25, 35, a support 27, 37 and a root 29, 39 embedded in a recess 210, 310 of the disk 21. The distance separating the root 29, 39 from the end of the airfoil 23, 33 constitutes the respective lengths of the first 20 and the second 30 blade. The length of the first blade 20 and the second blade 30 is therefore considered here a substantially radially with respect to the longitudinal axis X-X of rotation of the rotor modules 2, 3. During operation, the airfoil 23, 33 is swept by a flow 5 passing through the turbomachine, and the platform 25, 35 forms a portion of the internal surface of the flow path 5. Generally, as can be seen in FIGS. 2 and 3a, the fan 2 and the low-pressure compressor 3 comprise a plurality of blades 20, 30 distributed circumferentially around the longitudinal axis X-X. As can be seen in FIG. 1a, the low-pressure compressor 3 also comprises an annular ferrule 32 also centered on the longitudinal axis X-X. The ferrule 32 comprises a circumferential extension 34, also annular, extending toward the platform 25 of the first blade 20. This annular extension 34 is the bearer of radial tip edge seals 36 configured to prevent losses of air flow from the flow path 5. Moreover, the ferrule 32 is attached to the fan 2 disk 21 by means of attachments 22 distributed circumferentially around the longitudinal axis X-X. Such attachments can for example be bolted connections 22. Alternatively, such attachments 22 can be accomplished by bracing to which is associated an anti-rotation device and/or an axial locking system. Finally, with reference to FIG. 3a, the assembly formed from the fan 2 and from the compressor 3 is rotated by a rotating shaft 6, called the low-pressure shaft, to which the fan 2 and the low pressure compressor 3 are integrally connected by means of a rotor trunnion 60, the low-pressure shaft 6 also being connected to a low-pressure turbine 7, downstream of the turbomachine, and extending along the turbomachine longitudinal axis X-X.

In operation, the fan 2 aspires air of which all or part is compressed by the low-pressure compressor 3. The compressed air then circulates in a high-pressure compressor (not shown) before being mixed with fuel, then ignited within the combustion chamber (not shown), to finally be successively expanded in the high-pressure turbine (not shown) and the low-pressure turbine 7. The opposite forces of upstream compression, and downstream expansion, give rise to aeroelastic flutter phenomena, which couple the aerodynamic forces on the blades 20, 30 and the vibrational movements of flexure and torsion in the blades 20, 30. As illustrated in FIG. 2, this flutter causes, in particular, intense torsional forces within the low-pressure shaft 6 which are passed on to the fan 2 and to the low-pressure compressor 3.

The blades 20, 30 are then subjected to tangential pulsing, particularly along a vibration mode with zero dephasing. This is in fact a flexural mode with a zero inter-blade 20, 30 dephasing, implying a non-zero moment on the low-pressure shaft 6, the natural frequency of which is approximately one and a half times greater than that of the first vibration harmonic, and the deformation of which has a nodal line at mid-height of the blade 20, 30. Such vibrations limit the mechanical endurance of the fan 2 and of the low-pressure compressor 3, accelerate the wear of the turbomachine and reduce its lifetime.

Figure 3B:
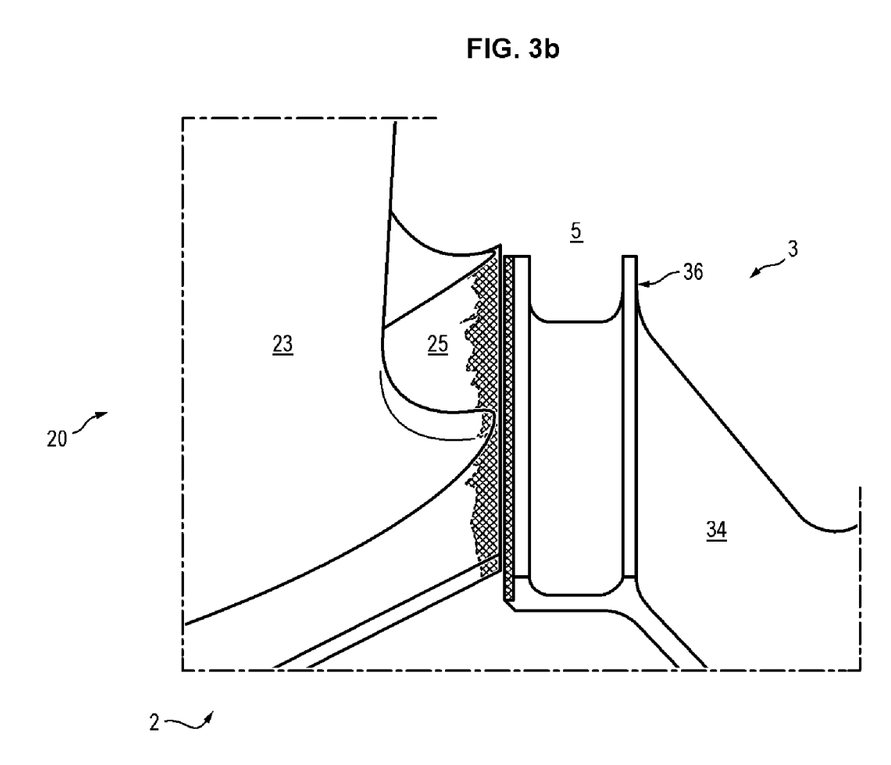
FIG. 3b is a schematic perspective enlargement of the interface between two turbomachine rotor modules illustrating its tangential movements relative to said rotor modules.

As can be seen in FIG. 3a, the tangential movement by flutter of the fan 2 blade 20 is different from that of the ferrule 32 of the low-pressure compressor 3. In fact, the length of the fan 2 blades 20 being greater than that of the low-pressure compressor 3 blades 30, the tangential flexural moment caused by the pulses of a fan 2 blade 20 is much greater than that caused by the pulses of a low-pressure compressor 3 blade 30. In addition, the stiffness of mounting within the fan 2 is different from that of mounting within the compressor 3. With reference to FIG. 3b, this deviation in tangential pulses is visible in particular at the interface between the platform 25 of a fan 2 blade 20 and the tip edge seals 36 of the ferrule 32.

Putting into contact a support surface 42 of the damping device 4 attached to the attachments 22, and the internal surface 250 of a blade 20 platform 25 ensures tangential coupling with a high stiffness between the fan 2 and the low-pressure compressor 3, so as to reduce the tangential vibrations previously described. In addition, the attachment by means of two feet 41 disposed on either side of the support 27 ensures stability of the damping device 4 during operation, and allows an advantageous control of the tangential stiffness of the assembly 1.

In addition, the tangential coupling is the greater, thanks to the damping device 4, as the zone within which the damping device 4 is disposed has greater relative tangential movements for the zero-dephasing mode considered, as illustrated in FIGS. 3a et 3b. Typically, these relative movements are on the order of a few millimeters, or even a few tenths of millimeters. To that extent, the damping device 4 also advantageously retains effectiveness on the vibrational modes of the fan 2 blades 20 with non-zero dephasing. Advantageously, as can be seen in FIG. 1b, all or a part of the fan 2 blades 20 can be equipped with such a damping device 4, depending on the desired damping, but also on acceptable maintenance characteristics. In this case, two feet 41 of two circumferentially successive damping devices 4 will be connected to the same attachment 22.

One exemplary embodiment of the equipment of two first fan 2 blades 20 is illustrated in FIG. 1b.

As can be seen in this figure, the fan 2 comprises a disk 21 centered on the turbomachine longitudinal axis X-X, two first blades 20 being mounted on the external periphery of the disk 21 from which they extend, the first blades 20 each comprising an airfoil 23, a platform 25, a support 27 and a root 29 embedded in a recess 210 of the disk 21. In addition, the low-pressure compressor is connected to the first rotor module by means of a first, a second and a third attachment 22, and it comprises a second blade 30 with a length smaller than the length of the two first blades 20. Moreover, a first damping device 4 is attached to the first and to the second attachment 22 between the fan 2 and the low-pressure compressor 3, so as to dampen their vibrational movements during operation, and comprises:

a head 40, said head 40 comprising a first radial external surface 42 supported with friction against an internal surface 250 of the platform 25 of a first of the two first blades 20, and two attachment feet 41 extending on either side of the support 27 of the first of the two first blades 20, each of the attachment feet 41 being respectively connected to one of the first or of the second attachment 22.

Finally, a second damping device 4 is attached to the second and to the third attachment 22 between the fan 2 and the low-pressure compressor 3, so as to dampen their vibrational movements during operation, and comprises:

a head 40, said head 40 comprising a first radial external surface 42 supported with friction against an internal surface 250 of the platform 25 of a second of the first blades 20, and two attachment feet 41 extending on either side of the support 27 of the second of the two first blades 20, each of the attachment feet 41 being respectively connected to one of the second or of the third attachment 22.

The first and the second damping device 4 are thus circumferentially consecutive and share the second attachment 22. This exemplary embodiment allows a reduction in the number of attachment feet 41, benefitting the overall mass of the assembly 1. In addition, the attachments of circumferentially successive damping devices 4 being put in common (i.e. the attachment of a damping device 4 being put in common with the attachments of the two damping devices 4 which are circumferentially adjacent on either side of said damping device 4), it is not necessary to provide for two attachments 22 per first blade 20, because three attachments 22 for two successive first blades 20 is sufficient, as illustrated in FIG. 1b. Consequently, the attachments 22 are circumferentially more separated from one another than if each first blade 20 disposed of two attachments 22. As a result, the stability of the damping devices 4 is improved, particularly when they are subjected to tangential vibrational forces which would tend to deform them circumferentially. This can in fact occur during the rotation speed vibrations of the fan 1 and during the changing of vibrational modes.

Figure 5B:
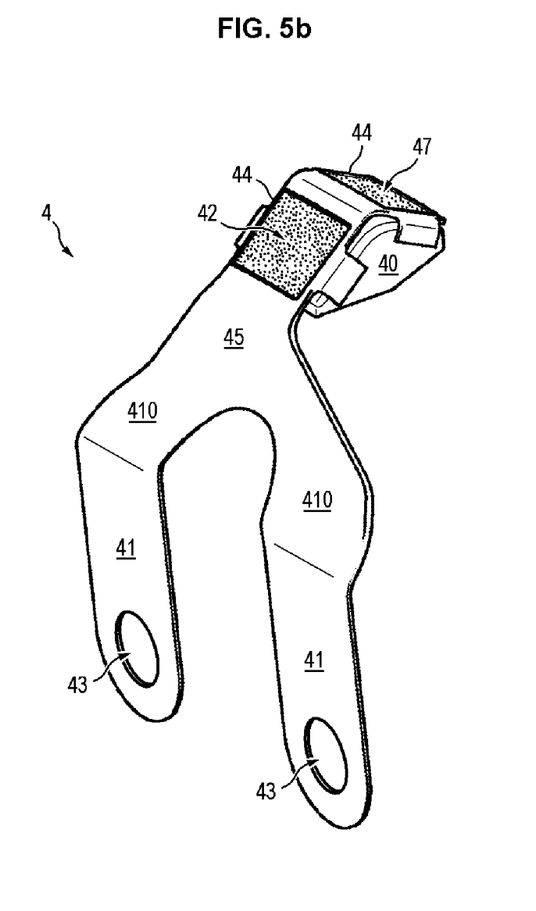
FIG. 5b illustrates schematically an exemplary embodiment of a damping device according to the invention.

In a variant embodiment illustrated in FIGS. 5a and 5b, the head 40 comprises a second radial external surface 47 supported with friction against the low-pressure compressor 3 so as to also dampen their respective vibrational movements during operation. This second radial external surface 47 improves the considerable tangential stiffness coupling between the fan 2 and the low-pressure compressor 3 so as to reduce the tangential vibrations previously described. The coupling is in fact greater as the zone within which the damping device 4 is disposed has greater relative tangential movements for the zero-dephasing mode considered, as illustrated in FIGS. 3a and 3b. Typically, these relative displacements are on the order of a few millimeters, or even a few tenths of millimeters. To that extent, the damping device 4 also advantageously retains effectiveness on the vibrational modes of the fan 2 blades 20 with non-zero dephasing.

In the variant embodiment illustrated in FIGS. 5a and 5b, the first radial external surface 42 extends in a plane substantially parallel to the plane in which the second radial external surface 47 extends. In other words, these two planes are inclined with respect to one another by an angle near 180°, comprised for example between 165° and 195°. In addition, as can be seen in FIG. 5a, the second radial external surface 47 is supported with friction against the circumferential extension 34 of the ferrule 32 and, advantageously, against an internal surface 360 of the tip edge seals 36.

Of course, the variant embodiment illustrated in FIGS. 5a and 5b can be used for equipping the two first fan 2 blades 20 illustrated in FIG. 1b.

In a first embodiment, with reference to FIGS. 1b, 4, 5a and 5b, the attachment feet 41 are formed of, preferably elastic, sheet metal, bent for example by stamping. The attachment feet 41 have an elongated shape in which the elongation axis has a substantially radial orientation with respect to the turbomachine longitudinal axis X-X, once mounted in the assembly 1.

The attachment feet 41 each further comprises an opening 43 cooperating with the attachments 22 of the fan 2 to the low-pressure compressor 3.

Each foot 41 has the shape of a strip, substantially planar, extending transversely to the turbomachine longitudinal axis X-X, in a first plane. The attachment feet 41 also join at a median portion 45 providing the junction between the attachment feet 41 and the head 40 of the damping device 4. In this manner, the attachment feet 41 and the head are formed integrally from a single piece. The median portion 45 also extends transversely to the turbomachine longitudinal axis X-X, in a second plane offset axially downstream with respect to the first plane. Advantageously the upper portion 410 of each attachment foot 41 extends transversely to the first and to the second plane, so as to connect the attachment feet 41 to the median portion 45. The length and the thickness of each strip forming a root 41, the width of the median portion 45, and the inclination of the upper connecting portions 410 with respect to the turbomachine longitudinal axis X-X are all parameters thanks to which it is possible to control the tangential coupling between the fan 2 and the low-pressure compressor 3 for the purpose of damping the previously described vibration modes having zero dephasing, but also influencing the vibration modes with non-zero dephasing.

Figure 4:
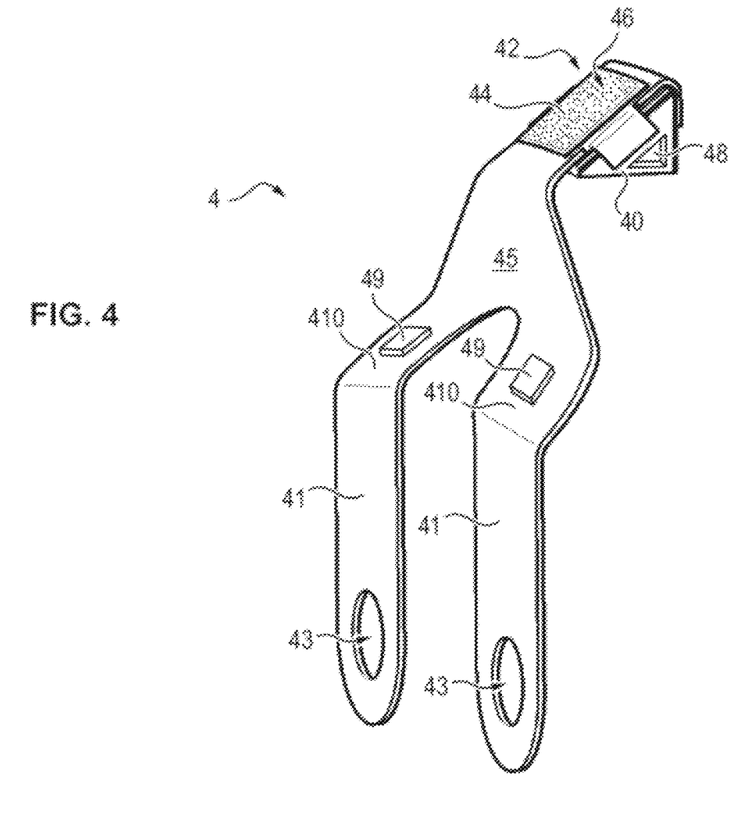
FIG. 4 illustrates schematically an exemplary embodiment of a damping device according to the invention.

In a second embodiment, still with reference to FIGS. 4, 5a and 5b, the damping device 4 comprises a sacrificial plate 44 of which the external portion defines the support surface 42. This plate 44 is configured to guarantee the support with friction of the first radial external surface 42 of the damping device 4 on the fan 2. Indeed, mechanical forces during operation are such that slight tangential, axial or radial movements of the damping device 4 should be expected. These movements are in particular due to tangential pulses to be damped, but also the centrifugal loading of the assembly 1. It is necessary that these movements do not cause wear on the blades 20, the coatings of which are relatively fragile. In this regard, the sacrificial plate 44 comprises an anti-wear material, for example of the Teflon type or any composite material specifically known to a person skilled in the art. In addition, the sacrificial plate 44 can be treated by dry lubrication, with the purpose of sustaining the value of the friction coefficient between the damping device 4 and the blade 20 platform 25. This lubrication is for example of the $MoS_2$ type.

For the purpose of improving the support with friction of the damping device 4, the sacrificial plate 44 can also comprise an additional coating 46, as can be seen in FIG. 4. Generally, such a coating 46 is configured to reduce friction and/or wear of engine parts between the plate 44 and the rotor modules 2, 3.

This coating 46 is for example of the viscoelastic type. Such a coating 46 then advantageously comprises a material having properties similar to those of a material such as those of the series having the commercial designation "SMACTANE®", for example a material of the "SMACTANE® 70" type. Another means of increasing the tangential stiffness of the assembly 1 is to sufficiently preload the viscoelastic coating 46, for example during assembly of the assembly 1, so that the relative tangential movement between the blade 20 and the ferrule 32 is transformed into viscoelastic shear of the coating 46 alone.

Alternatively, this coating 46 is of the dissipative and/or viscoelastic and/or damping type. The dissipative coating 46 then comprises a material selected among those having mechanical properties similar to those of Vespel, of Teflon or of any other material with lubricating properties. In a more general manner, the material has a friction coefficient comprised between 0.3 and 0.07. Too high a flexibility would not allow damping the zero-dephasing mode, because the relative movements of the fan 2 and of the low-pressure compressor 3 would lead to friction and/or oscillations between a "glued" state and a "sliding" state of the damping device 4.

These additional coatings 46 are applied by gluing to the sacrificial plate 44.

In a third embodiment, damping by tangential coupling can be adjusted by controlling the mass of the damping device 4, which influences the shear inertia. This control operates by modifying the mass of the damping device 4, for example at the head 40 of the damping device 4. This mass can be modified in all or a part of the damping device 4 and/or of the head 40, typically by creating bores 48 to lighten, and/or by adding several inserts 49, metal for example, to add weight.

Advantageously, combination of the second and of the third embodiment allows adjusting the contact forces between the damping device 4 and the fan 2. In fact, contact forces that are too high between the fan 2 blade 20 and the damping device 4 would limit the dissipation of the vibrations during operation.

Different embodiments of the assembly 1 according to the invention have been described in the case where the first rotor module 2 is a fan, and the second rotor module 3 is a low-pressure compressor.

This, however, is not limiting, because the first rotor module 2 can also be a first, high or low pressure, compressor stage, and the second rotor module 3 a second stage of said compressor, successive to the first compressor stage, upstream or downstream of the latter. Alternatively, the first rotor module 2 is a first, high or low pressure, turbine stage, and the second rotor module 3 a second stage of said turbine, successive to the first turbine stage, upstream or downstream of the latter.

The invention claimed is:

1. A turbomachine assembly comprising:
a first rotor module comprising a disk centered on a turbomachine longitudinal axis, two first blades being mounted on the external periphery of the disk from which they extend, the first blades each comprising an airfoil, a platform, a support and a root embedded in a recess of the disk,
a second rotor module, connected to the first rotor module by means of a first, of a second, and of a third attachment, and comprising a second blade of smaller length than the first blades, and
a first damping device attached to the first and to the second attachment between the first and the second rotor module, so as to dampen their vibrational movements during operation, and comprising:
a head, said head comprising a first radial external surface supported with friction against an internal surface of the platform of a first of the two first blades, and
two attachment feet extending on either side of the support of this first of the two first blades, each of the attachment feet being respectively connected to one of the first or of the second attachment, and
a second damping device attached to the second and to the third attachment between the first and the second rotor module so as to dampen their vibrational movements during operation, and comprising:
a head, said head comprising a first radial external surface supported with friction against an internal surface of the platform of a second of the two first blades, and
two attachment feet extending on either side of the support of this second of the two first blades, each of the attachment feet being respectively connected to one of the second or of the third attachment.

2. The assembly according to claim 1, wherein the attachment feet of one at least of the first or of the second damping device are formed from sheet metal.

3. The assembly according to claim 1, wherein the head of one at least of the first or of the second damping device comprises a sacrificial plate, said plate comprising an additional coating defining the supporting surface.

4. The assembly according to claim 3, wherein the additional coating is of the dissipative type.

5. The assembly according to claim 3, wherein the additional coating is of the viscoelastic type.

6. The assembly according to claim 1, wherein one at least of the first or of the second damping device comprises bores designed to lighten the damping device.

7. The assembly according to claim 1, wherein one at least of the first or of the second damping device comprises inserts designed to add weight to the damping device.

8. The assembly according to claim 1, wherein the first module is a fan, and the second module is a low-pressure compressor.

9. The assembly according to claim 1, wherein the head of one at least of the first or of the second damping device comprises a second radial external surface supported with friction against the second rotor module so as to also dampen the respective vibrational movements of the first rotor module and of the second rotor module during operation.

10. A turbomachine comprising an assembly according to claim 1.

11. A damping device configured to be attached to at least two attachments between the first and the second rotor module of an assembly according to claim 1, so as to dampen their vibrational movements during operation.

* * * * *